United States Patent [19]

Stokes

[11] Patent Number: 4,887,786
[45] Date of Patent: Dec. 19, 1989

[54] PORTABLE DUAL UMBRELLA HOLDER

[76] Inventor: R. W. Stokes, Box 784, Mackinaw, Ill. 61755

[21] Appl. No.: 172,253

[22] Filed: Mar. 23, 1988

[51] Int. Cl.$^4$ .................................................. F16M 13/00
[52] U.S. Cl. ....................................... 248/512; 248/539
[58] Field of Search ............... 248/534, 539, 512, 513; 280/79.1 A, 62, 170, 175, DIG. 5, DIG. 6; 224/42.45 R, 274

[56] References Cited

U.S. PATENT DOCUMENTS

| | | |
|---|---|---|
| 840,406 | 1/1907 | Williams .............................. 248/516 |
| 1,857,774 | 5/1932 | Wckman .............................. 248/513 |
| 2,905,187 | 9/1959 | Croce .................................. 248/515 |
| 3,148,851 | 9/1964 | Condon ............................... 248/515 |
| 3,304,035 | 2/1967 | Davis ................................... 248/516 |
| 4,008,874 | 2/1977 | Conway ......................... 280/DIG. 6 |
| 4,334,692 | 6/1982 | Lynch ............................. 224/274 X |
| 4,550,930 | 11/1985 | Proffit ............................. 224/274 X |

Primary Examiner—J. Franklin Foss
Attorney, Agent, or Firm—Sixbey, Friedman, Leedom & Ferguson

[57] ABSTRACT

The present invention relates to portable dual umbrella holders and is specifically concerned with providing a holder which is adapted to mount at least two umbrellas individually over the seat and bag holding portions of a motorized golf cart. Prior art devices have only provided holders for supporting a single umbrella which are permanently mounted on a golf cart either motorized or of the pull-type with no means to quickly disassemble the holder for transport to and from a golf course. The structure of the present invention overcomes such problems by providing a dual umbrella holder which can be conveniently disassembled and converted to a compact transportable condition in which the holder is able to be inserted and carried along with the golf clubs in the golfer's bag.

6 Claims, 2 Drawing Sheets

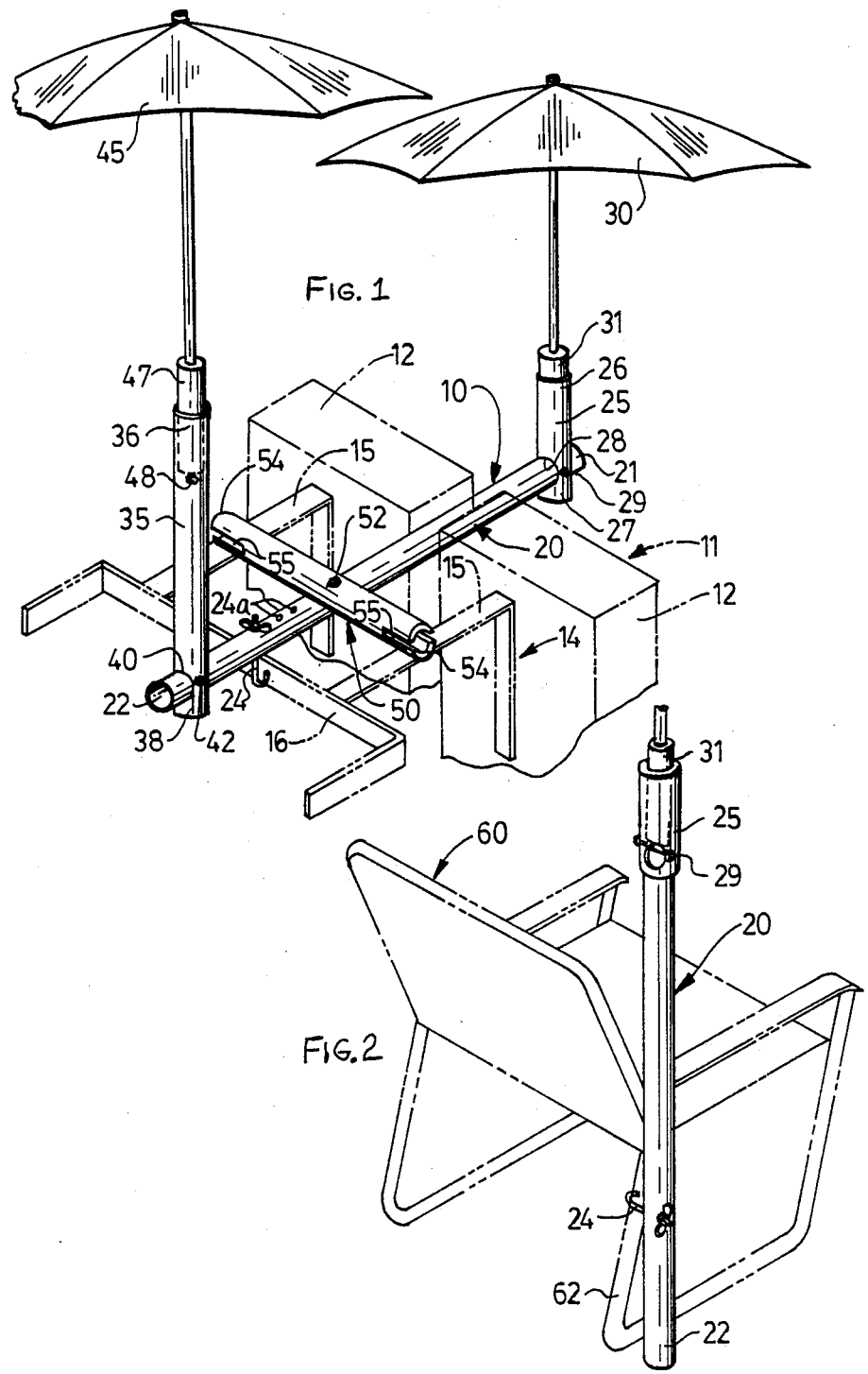

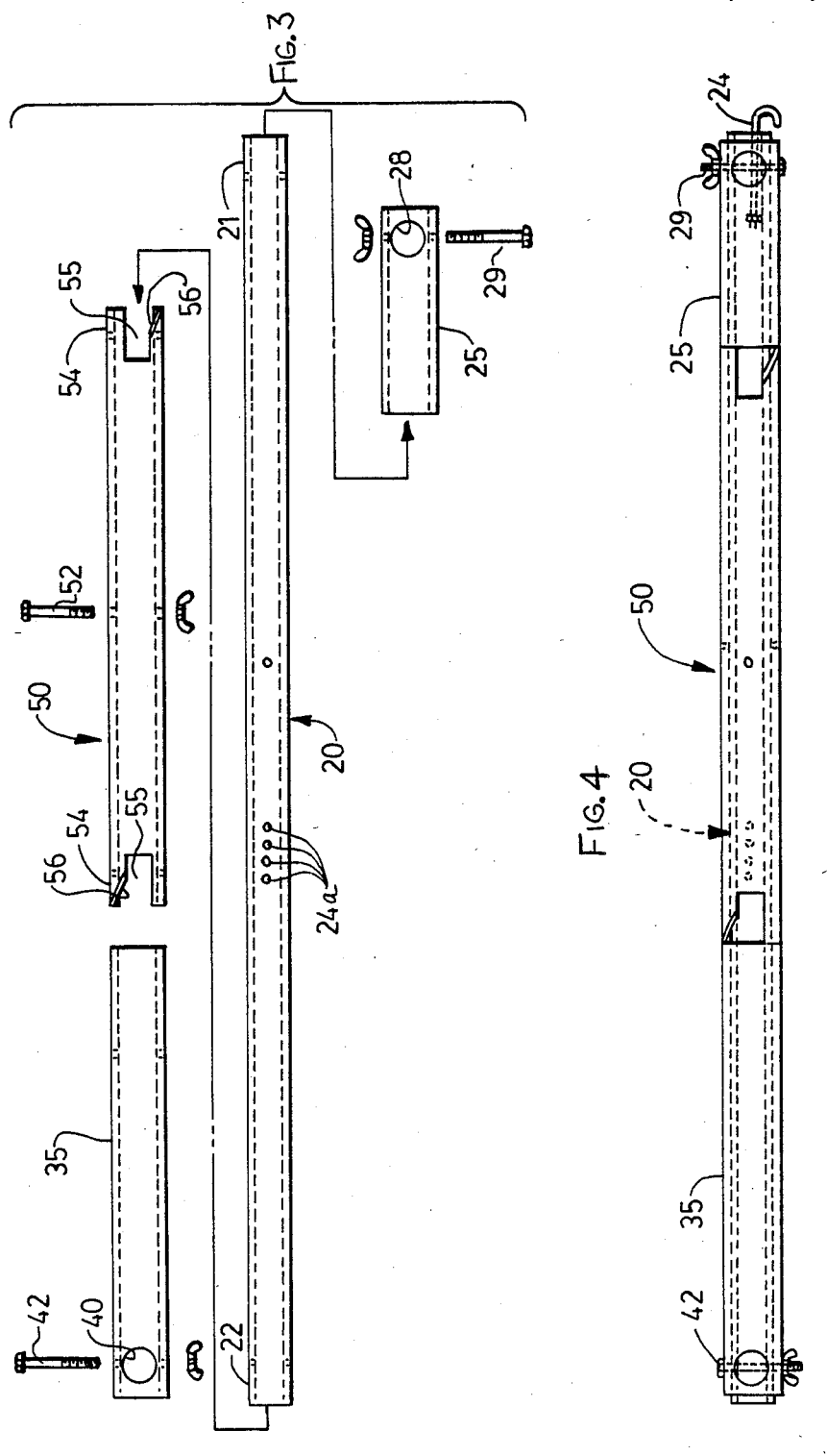

PORTABLE DUAL UMBRELLA HOLDER

1. Technical Field

The present invention broadly relates to portable umbrella holders and more particularly to such holders adapted for use on motorized golf carts, beach and lawn chairs and other seating devices which are desired to be shaded.

2. Background Art

The average weekend golfer usually rents motorized golf carts at a golf course which at least at most public courses do not provide a top or other means for shading the occupants. Other golfers who may prefer to walk usually own or rent a pull cart which is easily folded into a somewhat more compact transport position that can be conveniently carried in a trunk of an automobile. Most of these have an externally mounted umbrella holder for carrying the umbrella in a retracted transport position which during use must be removed and carried by the golfer in between shots. Because of the inconvenience of having to carry the umbrella, they are only used during rainstorms since such inconvenience is not frequently tolerated for use of the umbrella to provide shade. The prior art devices for both motorized and pull carts are best exemplified by the following U.S. Patents. The Davis Patent No. 3,304,036; the Conway Jr. Patent No. 4,008,874; and the Lynch Patent No. 4,334,692. These patents all provide a holder for but a single umbrella over either the occupants of the motorized golf cart or the golf bag carried by the pull-type cart. A major problem with playing golf in the rain is keeping the golf clubs and particularly the grips dry. Sometimes a towel is draped over the clubs which must be removed each time a club is selected which must be carefully re-installed after each shot. This has been barely adequate at best since the towel quickly becomes saturated, frequently blows off the cart, is time consuming holding up play and only provides another significant distraction to the golfers concentration on the game. It is recognized, therefore, that it would be highly desireable to provide an umbrella holder which is adapted to conveniently mount at least two umbrellas over the passengers of a golf cart as well as over the golf clubs and which can be quickly installed and removed from a golf cart and knocked down for insertion into a golf bag with the clubs for ease of transport between rounds.

DISCLOSURE OF THE INVENTION

In accordance with one aspect of the present invention, there is provided a portable dual umbrella holder for golf carts and the like providing an elongated tubular main support member with a pair of relatively shorter tubular umbrella receiving members individually removably mounted on the opposite ends of the main support member in substantially perpendicular relation thereto and an elongated tubular cross tube removably connected to the main support member intermediate its ends and having laterally outwardly extended ends removably connected to the cart for holding the umbrella holder in an operative position thereon but providing a knock down transport condition removed from the cart in which such shorter tubular members and said cross tube are longitudinally slideably mountable on said main support member.

BRIEF DESCRIPTION OF THE DRAWINGS

FIG. 1 is a three dimensional view of the portable dual umbrella holder of the present invention shown in an operating position mounted on a fragmentary representation in phantom lines of a motorized golf cart seating and bag mounting portion thereof.

FIG. 2 is a three dimensional view of the portable dual umbrella holder of FIG. 1 utilizing only a minimum of the components to show an alternative operating position connectable to a phantom line representation of a lawn chair or the like.

FIG. 3 is a side elevational exploded view of the individual components of the portable dual umbrella holder of the preceding Figs. showing the components in an individual knock down non-operative condition.

FIG. 4 is a side elevational view of the components of FIG. 3 assembled in a compact telescoped unitary transport condition.

BEST MODE FOR CARRYING OUT THE INVENTION

Referring more particularly to FIG. 1 of the drawings, a portable dual umbrella holder embodying the principles of the present invention is generally indicated by the reference numeral 10. The holder is adapted for use on a conventional motorized golf cart generally indicated by the reference numeral 11 having a pair of side-by-side seats 12. The seats are mounted on the cart by a seat support frame 14 having a pair of transversely spaced substantially parallel upper horizontal bars 15 which are connected at their rearward ends to an integral bag holding bar 16 at the rear of the golf cart.

The portable dual umbrella holder 10 of the present invention provides an elongated main support tube 20 having predetermined front and rear ends 21 and 22, respectively. The support tube may be constructed of a lightweight plastic material such as P.B. tubing or from any other lightweight metallic tubing such as aluminum or the like. The front end 21 of the main support tube is extended longitudinally forwardly between the seats 12 on the golf cart while the rearward end 22 thereof is rested upon the transverse bag holding bar 16 at the rear of the golf cart. The main support tube is quickly and conveniently attachable to the golf cart by a hook bolt and wing nut assembly 24 which is extended through a suitable hole 24a adjacent the rear end 22 of the tube for hooking around the lower edge of the bag holding bar 16 and secured on top of the tube by a wing nut portion of the assembly. A plurality of the holes 24a are formed through the main support tube in longitudinally spaced relation to adjustably position the hook bolt fore and aft as might be necessary.

A relatively short front umbrella holding tube 25 is mounted on the forward end 21 of the main support tube 20 in substantially upstanding relation therefrom. The front umbrella holding tube is of a diameter somewhat larger than the diameter of the main support tube and includes opposite upper and lower ends 26 and 27, respectively. An enlarged transverse bore 28 is formed adjacent to the lower end 27 of the upstanding umbrella holding tube of a size to be slideably mounted on the main support tube and secured by a bolt and wing nut assembly 29. A front umbrella 30 has a lower handle portion 31 which is slideably received within the upper end 26 of the front tube with the handle resting against the bolt and nut assembly 29 to limit further insertion of the handle into the tube.

A rear umbrella holding tube 35 is mounted in upstanding relation on the rear end 22 of the main support tube and is of the same diameter as the front umbrella receiving tube 25. The rear holder tube has an upper end 36 and an opposite lower end 38 which provides a transverse bore 40 therethrough of a size to slideably receive the rear end of the main support tube 20 therethrough. A bolt and wing nut assembly 42 is extended through the lower end 38 of the rear umbrella holding tube 35 in transverse perpindicular relation to the bore 40 for rigidly mounting the rear tube in upstanding umbrella holding position. The rear tube is substantially longer or about twice the length of the front tube 25 and is adapted to mount a rear umbrella 45 having a handle 47 inserted into the upper end 36 thereof. A stop bolt and nut 48 is extended through the rear tube 35 in downwardly spaced relation from the upper end thereof to provide a stop to contact the lower end of the handle 47 of the umbrella 45 in supporting relation to position the rear umbrella at a higher elevational position than the front umbrella 30.

A cross bracing tube 50 is disposed in transversely extended perpindicular relation on top of the main support tube 20 intermediate its ends by a pivot bolt and wing nut assembly 52. The cross tube has opposite ends 54 which are individually provided with longitudinally inwardly extended slots 55. The slots include diametrically opposed angular cut portions 56 which enable the cross tube 50 to be pivoted and swung into the transverse bridging position of FIG. 1 with the slots 55 thereof disposed in embracing relation to the upper horizontal bars 15 of the seat support frame 14 on the golf cart 11.

INDUSTRIAL APPLICABILITY

In use and again referring to FIG. 1 of the drawings the portable dual umbrella holder 10 of the present invention can be quickly and conveniently mounted on the motorized golf cart 11 for positioning the front and rear umbrellas 30 and 45, respectively, above the seats 12 and the bag holding section of the golf cart 11. The rear umbrella is positioned at a higher elevation than the front umbrella 30 in order to provide sufficient space between it and the golf bags, not shown, to permit convenient removal of the golf clubs from the bags without any interference from the umbrella. Accordingly, both of the occupants of the golf cart and the golf clubs being carried thereby will both be adequately shaded or maintained dry during inclement weather conditions without any participation or manual holding or positioning of the umbrellas by the golfers.

After use the portable dual umbrella holder 10 of the present invention can be easily disassembled by removal of the several bolt and wing nut assemblies 24, 29, 42 and 52 to separate the individual components thereof into the knock down condition shown in FIG. 3. Such components can then be easily reassembled into the transport position shown in FIG. 4 by merely sliding the front and rear umbrella tubes 25 and 35, respectively and the cross tube 50 onto the main support tube 20. The components are held in such telescoping position on the main support tube by re-installing the bolt and wing nut assemblies through the front and rear umbrella supporting tubes and the main support tube adjacent to its opposite ends. The hook bolt and wing nut assembly 24 is conveniently slipped into the end of the main support tube 20 prior to installation of the bolt and wing nut assembly of the front umbrella support tube which is effective to longitudinally constrain the hook bolt in the desired transport position. With the components disposed in such unitary compact transport condition of FIG. 4 the entire assembly can be easily inserted into a golf bag along with the clubs for ease of transport to and from the golf course between rounds.

As best shown in FIG. 2 the umbrella holder of the present invention is readily adapted for use to mount a single umbrella on a lawn chair or other seating device as may be desired. In this adaptation the longer rear umbrella mounting tube is removed from the main support tube which is then disposed in a vertically upright position alongside the lawn chair. The hook bolt and wing nut assembly is re-installed through the bore within the tube and is hooked about the leg or other supporting component of the lawn chair to maintain the main support tube rigidly in such vertical position. The front umbrella support tube 25 is inverted from its transport position shown in FIG. 4 and inwardly slid downwardly over the upper end of the main support tube and is retained in such position by reinstallation of the stop bolt and nut assembly 29. The lower end of the handle of the umbrella 30 is then installed in elevationally shielding position with respect to the lawn chair.

In view of the foregoing, it is readily apparent that the portable dual umbrella holder of the present invention provides an improved structure for supporting at least a pair of umbrellas in shielding relation to the occupants and golf clubs on a motorized golf cart. The holder can be conveniently and quickly removed from the golf cart and the components thereof quickly reassembled into a compact telescoping transport position rendering it capable of being inserted within a golf bag for transport to and from the golf course. It is also readily adaptable for providing a single umbrella holder which may be conveniently attached to a beach or lawn chair or other seating device which is desired to be shaded.

I claim:

1. A dual umbrella holder for golf carts having spaced seat and golf bag mounting sections, the seat section including a pair of seat back support frames and the golf bag mounting section including a bag support frame integral with the seat back support frames, said holder comprising:

an elongated main support member mountable on the cart in bridging relation between said seat and golf bag mounting sections;

a first upstanding umbrella receiving member mountable on said main support member and being of a predetermined length to support an umbrella above said seat section;

a second upstanding umbrella receiving member mountable on said main support member and being of a longer length than said first receiving member to support a second umbrella on the cart above said bag mounting section in a higher elevational position than said first umbrella;

quick-disconnect means on said main support member for releasably mounting said holder on the cart, said quick-disconnect means comprising a hook bolt mounted on said main support member which is releasably engageable with said bag support frame, and a cross support member pivotally mounted on said main support member in longitudinally spaced relation to said hook bolt for movement to a position perpendicularly disposed relative to said main support member in bridging engagement between said set back support frames.

2. The umbrella holder of claim 1 wherein said cross support member has slotted opposite ends swingable in embracing relation to said seat back support frames.

3. The umbrella holder of claim 2 in which said main support member is an elongated cylindrical tube of a predetermined diameter having predetermined forward and rearward ends;
   said first umbrella receiving member being a cylindrical tube having a transverse bore therethrough for slideably receiving said forward end of said main support tube;
   and said second umbrella receiving member being a cylindrical tube having a transverse bore therethrough for slideably receiving said rearward end of said main support tube.

4. The umbrella holder of claim 3 wherein said cross support member is a cylindrical tube of a diameter larger than said main support tube; and
   said first and second umbrella receiving tubes being of the same diameter as said cross support tube so as to be longitudinally slideably receivable in telescoping stacked arrangement on said main support tube when removed from the cart for transport within a golf bag.

5. The umbrella holder of claim 4 including means for exclusively mounting only said first umbrella receiving tube on said main support tube in longitudinally extended co-axial relation from said forward end thereof with said hook bolt being accessible for engagement with an adjacent support device.

6. A portable dual umbrella holder, for golf carts and the like, comprising;
   an elongated tubular ,aom support member having opposite ends;
   means releasably mounting said main support member on the cart;
   a pair of relatively shorter tubular umbrella receiving members individually removably mounted on said opposite ends of the main support member in substantially perpindicular relation thereto;
   and an elongated tubular cross tube removably connected to said main support member intermediate its ends and having laterally outwardly extended ends removably connected to the cart for holding the umbrella holder in an operative position thereon and having a knocked down transport conditon removed from the cart in which said shorter tubular members and said cross tube are longitudinally slideably mountable on said main support member.

* * * * *